United States Patent [19]

Mockovciak, Jr.

[11] Patent Number: 4,475,031
[45] Date of Patent: Oct. 2, 1984

[54] SOLAR-POWERED SUN SENSITIVE WINDOW

[75] Inventor: John Mockovciak, Jr., Dix Hills, N.Y.

[73] Assignee: Grumman Aerospace Corporation, Bethpage, N.Y.

[21] Appl. No.: 256,850

[22] Filed: Apr. 23, 1981

[51] Int. Cl.³ .............................................. H01J 40/14
[52] U.S. Cl. .................................... 250/212; 136/291; 350/331 R
[58] Field of Search .................... 350/331 R; 250/205, 250/201, 212; 136/291

[56] References Cited

U.S. PATENT DOCUMENTS

| 3,961,181 | 6/1976 | Golden | 250/299 |
| 4,083,356 | 4/1978 | Rajagopal | 350/331 |
| 4,268,126 | 5/1981 | Mumford | 350/331 R |

*Primary Examiner*—David C. Nelms
*Assistant Examiner*—D. Hostetter
*Attorney, Agent, or Firm*—John P. Kozma; Richard G. Geib; Daniel J. Tick

[57] ABSTRACT

A self-contained sun sensitive window made up of liquid nematic crystals sandwiched between two transparent conductors is powered directly by a solar cell. An increase in light intensity upon the solar cell reduces the transparency of the window, resulting in a constant intensity behind the window.

4 Claims, 3 Drawing Figures

SOLAR-POWERED SUN SENSITIVE WINDOW

BACKGROUND OF THE INVENTION

This invention relates to a self-regulating sun-sensitive window that automatically varies its opacity in response to incident solar energy.

In general, such windows derive their variable light transmittance quality from thin liquid films sandwiched between transparent conductive surfaces. The liquid film is responsive to changes in the electric field created by the conductors.

Several devices in the present art incorporate photosensitive devices in conjunction with liquid film devices. For example, U.S. Pat. No. 3,668,861, issued to Mitsui, discloses a watch display in which a photo transistor selects between a liquid crystal display system and solid state display depending on ambient illumination. U.S. Pat. No. 4,083,356, issued to Rajagopal, discloses a nematic liquid crystal window interposed between incident sunlight and a solar energy collector. The Rajagopal window may be controlled manually or in accordance with a desired parameter of the solar energy collector to prevent damaging temperatures in the system.

While it has been recognized that the opacity of liquid crystal films can be varied with a small amount of input energy, a shortcoming of these present art devices is that a remote power source is required to supply the electric field which controls the opacity or reflectivity of the device.

A general purpose sun sensitive window is described in the magazine article "Electronic Liquid Window" at pp. 31-35 and 106 of *Radio-TV Experimenter and Science and Electronics*, June-July 1969. While it is proposed that a photosensitive device may be used to regulate the opacity of the Radio-TV window, again there is no suggestion that the electric field necessary to alter the opacity may be derived solely from the light source itself by means of such photosensitive device.

SUMMARY OF THE INVENTION

It is therefore a primary object of the present invention to provide a self contained sun sensitive window which does not need an external power supply.

One further object of this invention is to provide a self contained sun sensitive window with manual override control.

The present invention could be used advantageously to reduce cooling loads in buildings and mass transit systems, as aircraft and spacecraft windows, and as an automatic sun shade for optical devices.

These objects and advantages are accomplished in brief by providing a liquid crystal window with a low output voltage, photosensitive device and a solid state voltage regulator. Such a regulator will convert the low output voltage from the photosensitive device to an appropriately scaled high voltage capable of effecting a change in the opacity of the liquid film in the window without the need of an external power supply.

DESCRIPTION OF A PREFERRED EMBODIMENT

Figure 1:
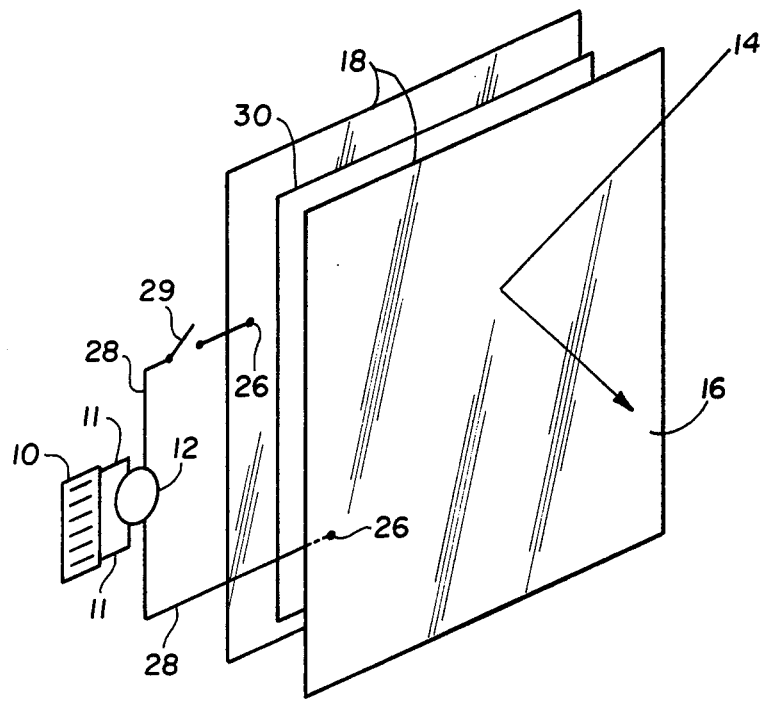
FIG. 1 is a schematic diagram of a self-contained sun sensitive window according to the present invention.

Referring to FIG. 1, a solar power source 10, such as a solar cell, is connected by leads 11 to voltage regulator means 12. The solar power source 10 is located so that sunlight incident upon it is representative of sunlight 14 incident upon the window 16.

Figure 2:
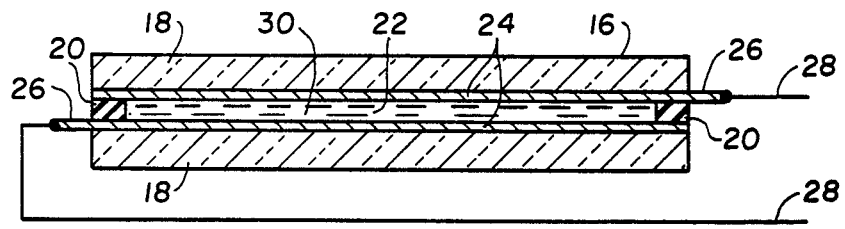
FIG. 2 shows a cross section of the window.

FIG. 2 shows in greater detail the construction of window 16. Two layers or plates of glass 18 or other transparent material placed parallel to each other are separated by a closure 20 to form a closed cavity 22 on the order of a half mil thick. On either side of cavity 22 the facing sides of glass sheets 18 are coated with a transparent electrically conductive coating 24 such as tin oxide or indium oxide. Two terminals 26 are connected to leads 28 which are in turn connected to the voltage regulator 12. A switch 29 is connected in series along leads 28. The cavity 22 is filled with a suitable electro-optical modulating material 30, such as nematic liquid crystal.

One skilled in the art will realize that various electro-optical modulating materials may be used in the present invention.

In general two types of liquid films are used in the prior art. The first type of film is normally opaque because of the random orientation of dipoles suspended in the liquid. An example is a suspension of iodo-quinine sulfate crystals in a liquid medium. When an electric field is applied to such a film, the resulting alignment of the suspended dipoles makes the film transparent. Thus, the strength of the electric current and the opacity of the film are inversely proportional. A second type of film, made up of fluid compounds which normally form orderly arrays, hence the term "liquid crystals," is characterized by an opposite reaction to electric fields. Thus, in the normal state the film transmits light. With increasing application of an electric field, the orderly arrays are thrown into disorder and retard light transmission.

While the light transmission characteristics of either type of film may be varied by varying the strength of the applied electric field, the second type of film is preferable in the present invention because the opacity of the window will be directly proportional to the incident light upon it, resulting in a uniform ambient light level behind the window.

Figure 3:
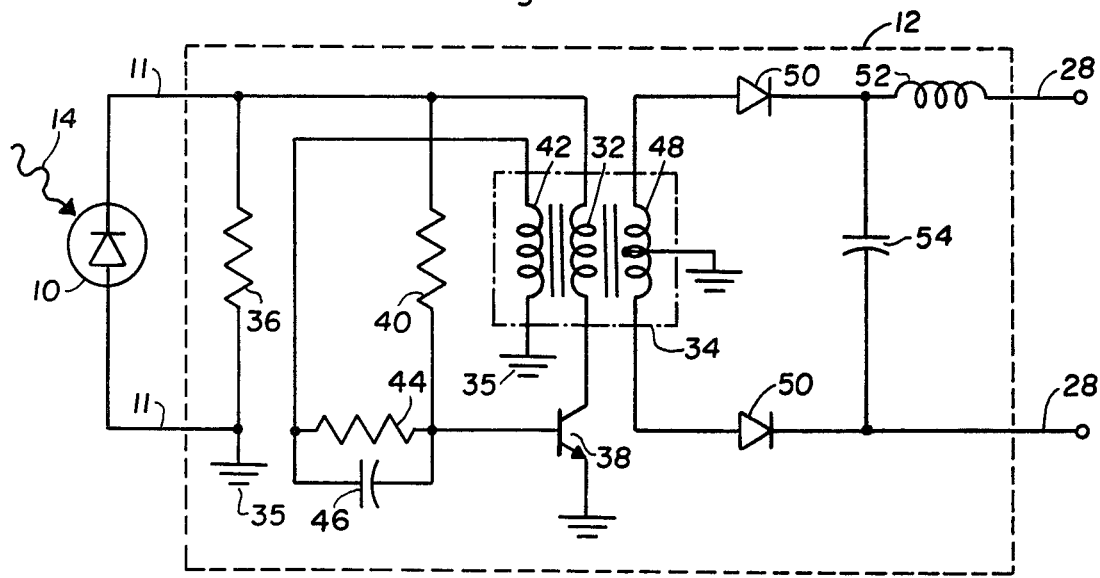
FIG. 3 shows a circuit diagram for a voltage regulator adapted for use in the present invention.

A circuit diagram for a blocking oscillator adapted for use as voltage regulator 12 is depicted in FIG. 3. Referring to FIG. 3, leads 11 are connected, respectively, to a first end of primary winding 32 of transformer 34 and to ground 35. Resistor 36 connects leads 11 to each other. A second end of primary winding 32 is connected to the collector of n-p-n transister 38. A resistor 40 connects the base of transistor 38 to the first end of primary wnding 32. Transformer 34 includes a bias winding 42 having one end grounded and connected at the other end to the base of transistor 38 by a parallel combination of resistor 44 and capacitor 46. The emitter of transistor 38 is connected to ground 35.

Secondary winding 48, having a larger number of turns than primary winding 32, is connected at either end to diodes 50, and also includes a center tap connected to ground 35. One of the diodes is connected directly to one of the leads 28, while the other diodes is connected to the other lead 28 by means of inductor 52. A capacitor 54 connects diodes 50 to each other.

OPERATION OF THE DEVICE

In operation, the solar power source 10 outputs an electric current proportional in intensity to the sunlight 14 incident upon it. This current is input to voltage regulator 12 by means of leads 11. The voltage regulator is a passive solid state device, and is used to derive an appropriate control voltage for window 16. Thus the output of the voltage regulator to leads 28 also serves as a power signal.

The voltage regulator serves to scale the output of the solar power source to an appropriate control/power signal, taking into account various design requirements such as the type of solar power source use, the size of the window, the size of the power source, the expected conditions under which the window will be used, the type of electro-optical modulating material used in the window the thickness of the film, etc. By varying the characteristics of the voltage regulator, the window can be adjusted for a variety of desired light intensities behind the window.

The blocking oscillator of FIG. 3 represents a typical device in the present art, as adapted for use in the present invention for converting a low DC voltage such as the current output by a solar power source, to a high DC voltage. The main component of the blocking oscillator is the transformer 34, wherein the relation between the input current from the solar cell 10 and the output voltage to leads 28 is determined by the turns ratio and flux linkage between primary winding 32 and secondary winding 48.

The operation of the blocking oscillator is as follows. The available current from solar cell 10, which current is proportional to the incident sunlight, will flow initially through resistors 36 and 40 and bias transistor 38 on. While transistor 38 remains on, this available current will be increasingly diverted to primary winding 32. As the current through winding 32 increases, a voltage will be induced in bias winding 42, holding transistor 38 on. When all of the available current has been diverted, i.e., the current stops increasing through primary winding 32, transistor 38 will again shut off, and the available current will rapidly return to resistors 36 and 30.

As the available current thus intermittently flows through the primary winding 32 in a sawtooth waveform, a high voltage will be induced in secondary winding 48, and this voltage will be smoothed by the ground-tap, full wave rectifier made up of diodes 50, inductor 52 and capacitor 54.

Since the available current to the blocking oscillator is governed by the incident sunlight, the voltage on leads 28 will also be proportional to ambient illumination. As an increased power signal is applied to leads 28, the electro-optical modulating film 30 in turn causes a larger percentage of the light incident upon it to be reflected or scattered. Thus, the opacity of the window is directly proportional to incident sunlight.

The switch 29 provides a manual override control. When switch 29 is closed, the window operates automatically as aforesaid. When open, the switch breaks the electrical connection between voltage regulator 12 and one of the conductive coatings of window 16, thus "opening" the window.

By combining a relatively small solar cell with a solid state voltage regulator, appropriately tuned to a liquid crystal window, no additional power supply is needed to vary the window's opacity or reflectivity. The only limitation on the applications of the present invention is the size of the glass sandwich, since in theory a group of two centimeter square ten percent efficiency solar cells, with appropriate solid state voltage regulation electronics, could power on the order of hundreds of square feet of a sun sensitive window.

While the foregoing represents a preferred embodiment of the invention, it should be understood that this description is by way of example only, and the scope of the invention is defined by the claims as set out below.

What is claimed is:

1. A self-contained, sun sensitive window comprising:
   a solar cell which outputs an electric current proportional to incident sunlight;
   passive voltage regulator means for converting the electric current output by the solar cell to a high DC voltage output;
   a pair of transparent plates placed parallel to each other;
   a closure placed between the plates such that the plates form a closed cavity;
   a pair of transparent, electrically conductive coatings on a pair of facing sides of the plates, said coatings being electrically connected to the output from the voltage regulator means; and
   a quantity of electro-optical modulating material filling the cavity between the plates.

2. The device of claim 1 which further comprises a switch means for breaking the electrical connection between the voltage regulator and one of the conductive coatings.

3. The invention of claim 1 wherein the voltage regulator means comprises a blocking oscillator having a transformer with a primary winding connected to the solar cell and a secondary winding having a larger number of turns than the primary winding, said primary and secondary windings being arranged in a circuit such that the current output by the solar cell intermittently flows through the primary winding in a sawtooth wave form, whereby a high voltage is induced in the secondary winding.

4. The invention of claim 1 wherein the electro-optical modulating material comprises a nematic liquid crystal.

* * * * *

UNITED STATES PATENT AND TRADEMARK OFFICE
CERTIFICATE OF CORRECTION

PATENT NO. : 4,475,031
DATED : 10/2/84
INVENTOR(S) : John Mockovciak, Jr.

It is certified that error appears in the above-identified patent and that said Letters Patent are hereby corrected as shown below:

Col. 2, Line 66, change "diodes" to -- diode --

Col. 3, Line 14, change "use" to -- used --

Col. 3, Line 18, after "window" insert a comma

Col. 3, Line 45, change "30" to -- 40 --.

Signed and Sealed this

Ninth Day of July 1985

[SEAL]

Attest:

DONALD J. QUIGG

Attesting Officer     Acting Commissioner of Patents and Trademarks